July 5, 1932.    H. J. BERGMAN    1,865,738
MOWER GUARD AND KNIFE
Filed May 18, 1931
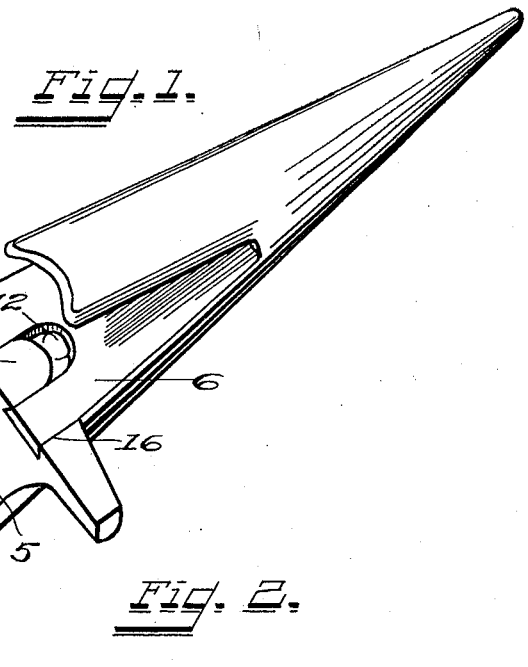
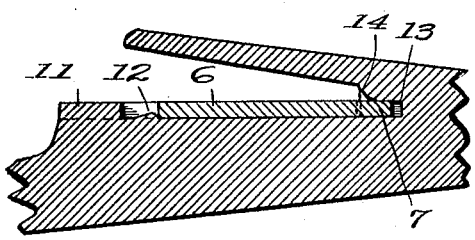
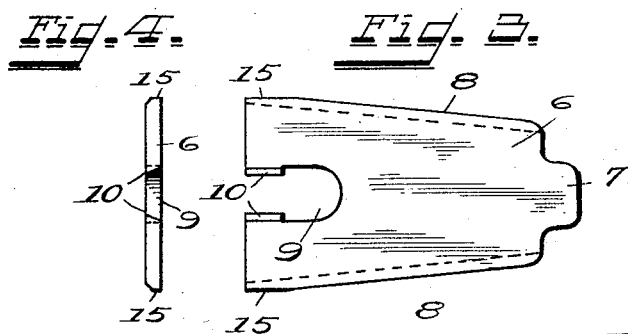
Inventor.
Henry J. Bergman
Atty.

Patented July 5, 1932

1,865,738

UNITED STATES PATENT OFFICE

HENRY J. BERGMAN, OF PEORIA, ILLINOIS

MOWER GUARD AND KNIFE

Application filed May 18, 1931. Serial No. 538,212.

My invention relates to the method of attaching a ledger plate to a mower guard, and it has for its object the construction and arrangement of the parts whereby the knife is securely attached to the guard and held in position without the use of bolts, rivets, or other additional parts of any kind, provision also being made for the removal of the ledger plate should occasion require either to sharpen or replace it with a new one.

The novelty of my invention will be hereinafter more fully set forth and specifically pointed out in the claims.

In the accompanying drawing:

Fig. 1 is a perspective view of a mower guard and ledger plate constructed in accordance with my present invention.

Fig. 2 is a broken central sectional side view of a portion of Fig. 1.

Fig. 3 is a plan view of the ledger plate.

Fig. 4 is an end view of Fig. 3.

The same numerals of reference are used to indicate identical parts in all the figures.

For purposes of illustration and to show one form of construction embodying my invention, though without limiting myself to the details and arrangement of parts shown and to be herein described, I have shown a structure consisting of only two parts, the guard 5 and the ledger plate 6.

I will first described the ledger plate. As more clearly shown in Fig. 3, the ledger plate is provided at one of its ends with a tongue 7. The ledger plate is preferably made narrower or tapering towards the end which carries the tongue 7 and is beveled to form a pair of cutting edges 8.

At the other end of the ledger plate from the tongue 7 a recess 9 is cut into the ledger plate, this recess being beveled as at 10 for a portion of its length.

The guard 5 carries a lug 11 which is undercut to correspond to the bevel 10 of the ledger plate as shown in Figs. 3 and 4, and forward of the lug 11 a slight projection 12 is formed to engage the forward edge of the recess 9 when the ledger plate is in operating position, the forward edge of the parts being that toward the point of the guard 5.

To place the ledger plate in position for engagement with the guard, it is laid in position so that the lug 11 enters the recess 9 and the tongue 7 is about to engage the recess 13 formed in the forward portion of the guard whereupon by driving the ledger plate forward, the beveled portions 10 engage the correspondingly undercut sides of the lug 11 and the tongue 7 begins to engage its recess 13, and is forced downwardly by the beveled portion 14 of this recess thus springing the ledger plate slightly by reason of its contact with the top of the projection 12. Upon the completion of the forward driving of the ledger plate, it snaps down over the projection 12 and is thereby locked in place.

To remove the ledger plate it is only necessary to drive it rearwardly by contact with one of the shoulders adjacent the tongue 7, these shoulders projecting a slight distance outside of the guard on each side thereof, whereupon the ledger plate will climb over the projection 12 and upon being driven rearwardly until the beveled portion 10 disengages from the corresponding undercut portion of the lug 11, whereupon the knife will be released.

The rear portions of the knife are formed parallel as at 15 and these engage the correspondingly formed portions 16 of the guard. It will be seen from the above that lateral strains of operation are carried by two surfaces in each direction, strains to the right being taken by the right hand side of the lug 11 and the left hand portion 16 and vice versa, in this way providing a much greater area of contact between the knife and the guard than is ordinarily provided to sustain lateral strains, and these are the most severe strains which the structure has to bear in operation.

Those parts of the guard and its associated parts which have not been specifically described herein remain of the ordinary or any suitable construction.

It will be seen from the above that I have provided a mower guard and knife which are constructed and arranged so that the knife may be mounted on the guard and held securely without requiring the use of any additional parts, while at the same time a structure is provided wherein the knife may be removed when required.

Having thus fully described my invention, I claim:

1. In a device of the character described the combination of a guard, a ledger plate receiving portion formed therein, an undercut lug carried by the guard and forming a part of the ledger plate receiving portion, a projection carried by the guard adjacent the undercut lug, a ledger plate, a recess formed therein and comprising in part a beveled portion to engage the undercut lug carried by the guard and a portion to engage the projection carried by the guard when the ledger plate is moved to operating position.

2. In a device of the character described the combination of a guard, a ledger plate receiving portion formed therein and comprising in part a forward recess and a rearward undercut lug, a ledger plate, a tongue carried by the ledger plate and engaging the recess of the guard, a recess formed in the ledger plate and comprising in part a beveled portion to engage the undercut lug carried by the guard whereby when the ledger plate is moved to operating position it will be held against accidental displacement.

3. In a device of the character described the combination of a guard, a ledger plate receiving portion formed therein and comprising in part a forward recess and an undercut lug and lateral shoulders, a ledger plate, a tongue carried by the ledger plate for engaging the recess for the guard, a recess for engaging the undercut lug and comprising in part a beveled portion, a projection carried by the guard for engaging the recess of the ledger plate when the latter is in operating position, and flattened sides carried by the ledger plate for engaging the lateral shoulders of the guard.

4. In a device of the character described the combination of a guard, a ledger plate receiving portion formed therein, a projection carried by the guard within the area of the ledger plate receiving portion, a ledger plate, projection receiving recess in the ledger plate to co-operate with the projection carried by the guard when the ledger plate is in operative position, and means co-operating between the ledger plate and the guard to cause the ledger plate to snap over the projection while being moved into operative position.

HENRY J. BERGMAN.